UNITED STATES PATENT OFFICE.

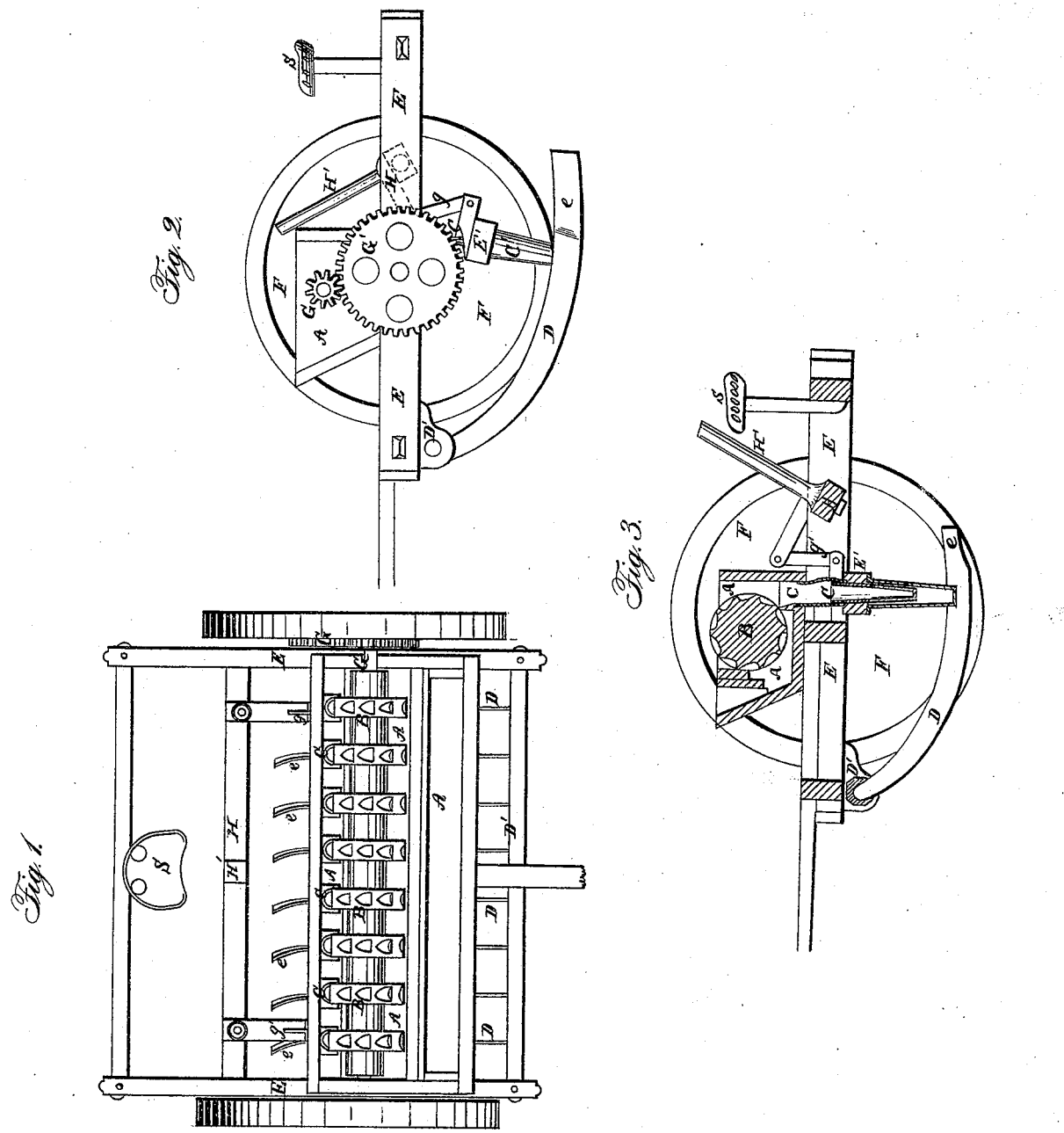

ELIJAH YOUNG, OF FAYETTEVILLE, MISSOURI.

IMPROVEMENT IN SEED-DRILLS.

Specification forming part of Letters Patent No. 54,995, dated May 22, 1866.

*To all whom it may concern:*

Be it known that I, ELIJAH YOUNG, of Fayetteville, in the county of Johnson and State of Missouri, have invented a new and useful Improvement in Seed-Drills; and I do hereby declare that the following is full, clear, and exact description thereof, reference being had to the accompanying drawings, and to the letters of reference marked thereon.

Figure 1 of the annexed drawings is a plan of the improved drill. Fig. 2 is a sectional elevation of the same, taken on the line $a\,b$ in Fig. 1. Fig. 3 is a sectional elevation of the drill, taken on the line $c\,d$ in Fig. 1.

This invention is an improvement on a patent granted to me on the 26th day of June, A. D. 1860; and it relates, first, to the manner of lifting the points of the drills up out of the ground by means of a lever attached to a rock-shaft or roller; secondly, this invention relates to the formation of the mold-boards of the plows connected with these drills, it being so arranged that it will throw the soil up into ridges, thereby securing all the benefits that may arise from deep planting.

In the present instance, as in the former patent, the seed to be planted is placed in the box or hopper A, from whence it is conveyed by the bucket-shaped indentations on the peripheries of the wheels B as by an elevator, and dropped down through the tubes C at or near the rear ends of the plows D. The said box or hopper is placed on top of the beams of the frame E, and the whole machine is mounted on the wheels F, which have their bearings on arms projecting from the outside of the frame E. The cog-wheels G G' are intended to operate the wheels B.

The plows D are of peculiar construction and can be readily understood by reference to the accompanying drawings. The mold-board $e$ extends several inches—say eight, more or less—behind the other parts of the plow, for the purpose of throwing the soil up into ridges, for the better protection of the grain from winter-killing, or from being frozen out of the ground. The plows are connected with the forward end of the frame E by means of the curved beam D'.

The tubes C conduct the falling grain into the upper ends of the metallic tubes C', the lower ends of which are permitted to reach the bottom of the furrow during the operation of planting. The upper ends of the tubes C' are firmly secured to the transverse beam E', which is suspended from the rock-shaft or roller H, by means of the links $g\,g'$, the roller H having its bearings in the beams of the frame E, and a lever, H', erected from its upper side in such a position that the driver seated upon the seat S can easily reach the top end of the lever, and by pulling it toward him raise the plows and tubes C' up out of the ground, as both plows and tubes are fastened together at the lower end of the tubes.

Having described my invention, what I claim, is—

1. Extending the mold-boards of the plows D out behind the other parts of the plows, as and for the purpose set forth.

2. The rock-shaft H, the lever H', and links $g\,g'$, or their equivalents, in combination with the beam E' and tubes C', when employed for the purpose herein set forth.

ELIJAH YOUNG.

Witnesses:
M. W. RANDOLPH,
A. WAGNER.